(12) United States Patent
Cheng

(10) Patent No.: US 6,386,731 B1
(45) Date of Patent: May 14, 2002

(54) LIGHT EMITTING ROTATING BODY ON AN AUTOMOBILE

(76) Inventor: Chen-Kang Cheng, 7Fl., No. 19, Alley 1, Lane 269, Wu Shing St., Taipei (TW)

( * ) Notice: Subject to any disclaimer, the term of this patent is extended or adjusted under 35 U.S.C. 154(b) by 91 days.

(21) Appl. No.: 09/649,911

(22) Filed: Aug. 30, 2000

(51) Int. Cl.[7] .............................. F21L 13/00; B60Q 1/26
(52) U.S. Cl. ...................... 362/192; 362/216; 362/217; 362/500; 362/544; 362/263; 362/800
(58) Field of Search ................................. 362/192, 216, 362/217, 500, 545, 459, 487, 485, 157, 158, 260, 263, 800

(56) References Cited

U.S. PATENT DOCUMENTS

| | | | |
|---|---|---|---|
| 4,725,928 A | * | 2/1988 | Strepek ........................ 362/192 |
| 4,893,877 A | * | 1/1990 | Powell et al. ............. 301/108.1 |
| 5,497,302 A | * | 3/1996 | O'Donnell .................. 362/184 |
| 5,873,600 A | * | 2/1999 | Conway ........................ 280/816 |

* cited by examiner

Primary Examiner—Thomas M. Sember
Assistant Examiner—David V. Hobden

(57) ABSTRACT

A light emitting unit of one or more kinds selected from light sources such as, neon lamp, cold cathode fluorescent lamp, electro luminescence (EL), and light emitting diode (LED) accommodated in a protecting enclosure together with a rectifier circuit, is mounted on a rotating body of an automobile such as a wheel or a tire. Power for illumination is supplied from an extra miniature generator installed on the rotating body converting its rotating kinetic energy into electrical energy by means of a specially designed vane, an eccentric swing block, and a bearing disc with associated transmission gear wheel to continuously supply electricity to the light emitting unit. Both sides of the automobile are therefore well illuminated in a dark environment so as to achieve traffic security and contribute to beautiful night scenery.

9 Claims, 5 Drawing Sheets

LIGHT EMITTING ROTATING BODY ON AN AUTOMOBILE

BACKGROUND OF THE INVENTION

(1) Field of the Invention

The present invention relates to a light emitting rotating body, and more particularly, to a rotating body on an automobile having a plurality of light sources thereon which get power supply from an extra-miniature generator driven by a rotatable vane installed on the rotating body so as to cause those light sources to illuminate surrounding roadway thereby not only providing traffic security night time lighting for vehicles and pedestrians, but also exhibiting a beautiful visual feeling for observers.

(2) Description of the Prior Art

The automobile industry has accumulated about 100-year experience, the progress achieved in mechanical structures and styles of all kinds of automobiles together with their kinetic characteristics is extraordinarily amazing, However, speaking of an automobile contribution, nothing is added except performing its inherent function of transportation by mean of its rotating wheels.

In a dark environment in lack of sufficient roadway lighting, the automobile lights, including headlights and tail lamps are relied on as an essential light source of an automobile. Now, there arises a problem that the head lights are for illuminating the roadway ahead of the automobile advancing direction as far as possible for identify dangerous obstacles, both sides and rear side of the automobile have to be watched by the driver with the back mirrors. Meanwhile, being clogged by dead angles inherent to the automobile structure, the driver usually cannot clearly watch out vehicles and pedestrians moving around nearby especially in a dark surrounding. In such a pathetic situation, maintenance of traffic security must be relied on the driver's alert treatment based on his/her inherent sensible cerebella response to a possible bursting danger.

In order to solve the above described problems, the present inventor paid attention to rotating of an automobile, e.g. wheels, and thought if there might be any possibility of providing auxiliary automobile lighting to illuminate nearby surrounding of the automobile other than in the front direction thereof especially in a dark environment, for example, night time, heavy rain, thick fog or sandstorm. Having been carried out theoretical studies and simulating experiments with long time efforts, the present inventor finally came to realization of the present invention based on these studies and researches.

SUMMARY OF THE INVENTION

It is a first object of the present invention to provide a light emitting rotating body by installing an extra miniature generator and a plurality of light sources on the wheels or other tires of an automobile so as to illuminate the surrounding of the automobile with power generated by the extra miniature generator as the automobile wheels rotate.

It is a second object of the present invention to improve traffic security for vehicles and pedestrians nearby with the light emitting rotating body of the present invention.

It is a third object of the present invention to exhibit a beautiful visual feeling for observers by illumination effect of the light emitting rotating body of the automobile.

It is a fourth object of the present invention to exhibit an innovative energy saving idea by the light emitting rotating body which produces required power usable to turn the light source by converting mechanical energy of rotating automobile wheels into electrical energy by an extra miniature generator.

To achieve these and other objects, there is a light emitting unit of one or more kinds selected from a group of light sources mentioned later installed on a rotating body of the automobile. The rotating body includes a wheel, a wheel cap/cover, a hub rotating disc, and a tire inlaid around the wheel.

An extra miniature generator installed on the rotating body is for converting the kinetic energy of the rotating body into electrical energy with a specially designed vane through an eccentric swinging block, and a bearing disc with associated gear wheel unit to continuously supply electricity to the light emitting unit. One or more than one second common AC/DC light sources including for example, neon lamp, cold cathode fluorescent lamp, electro luminescence (EL), and light emitting diode (LED), is/are accommodated in a protecting enclosure of the light sources together with its electronic rectifier circuit.

BRIEF DESCRIPTION OF THE DRAWINGS

The objects and advantages of the present invention will become more apparent by describing in detail the preferred embodiments of the present invention with reference to the attached drawings in which.

DETAILED DESCRIPTION OF THE PREFERRED EMBODIMENT

Figure 1:
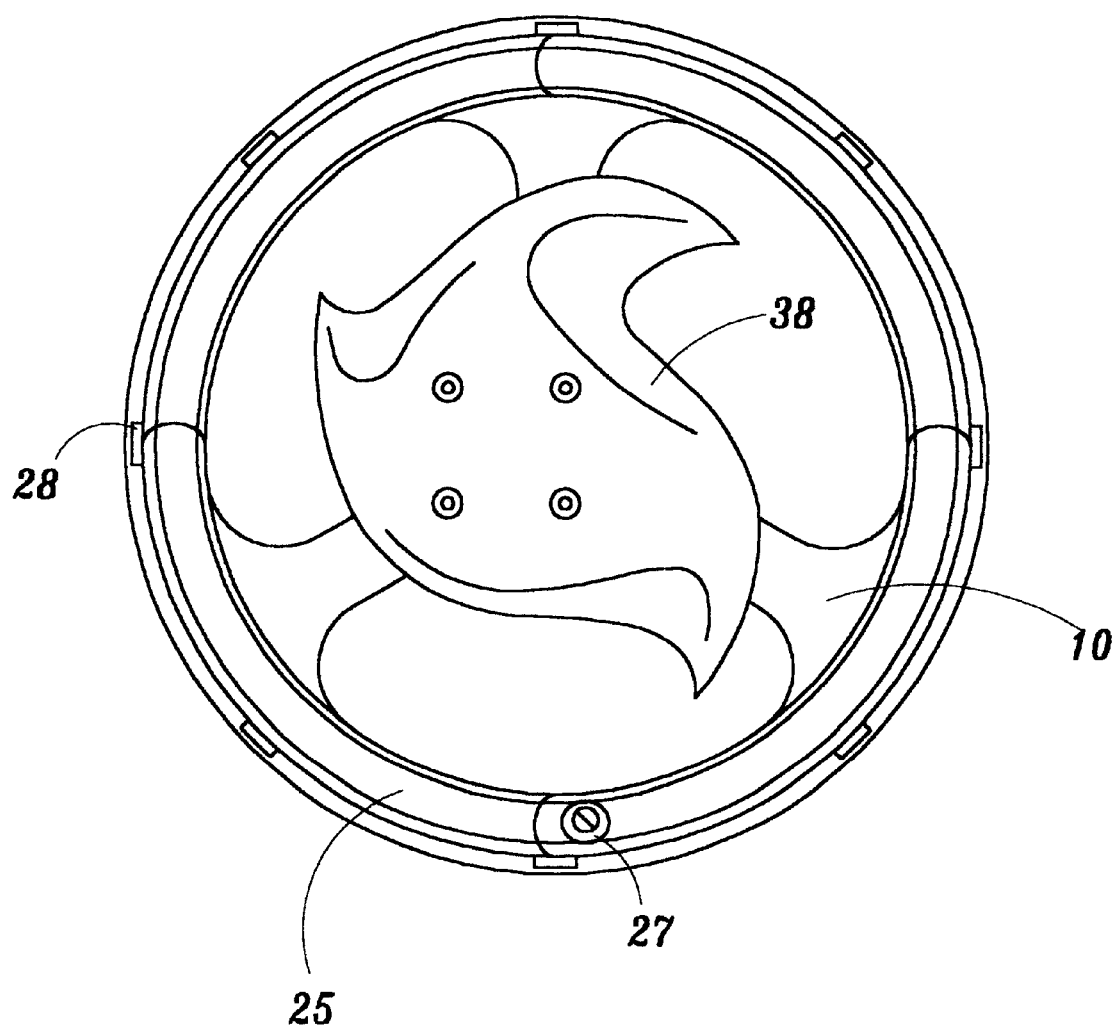
FIG. 1 is a schematic plan view of the light emitting rotating body of an automobile according to the present invention.
Figure 2:
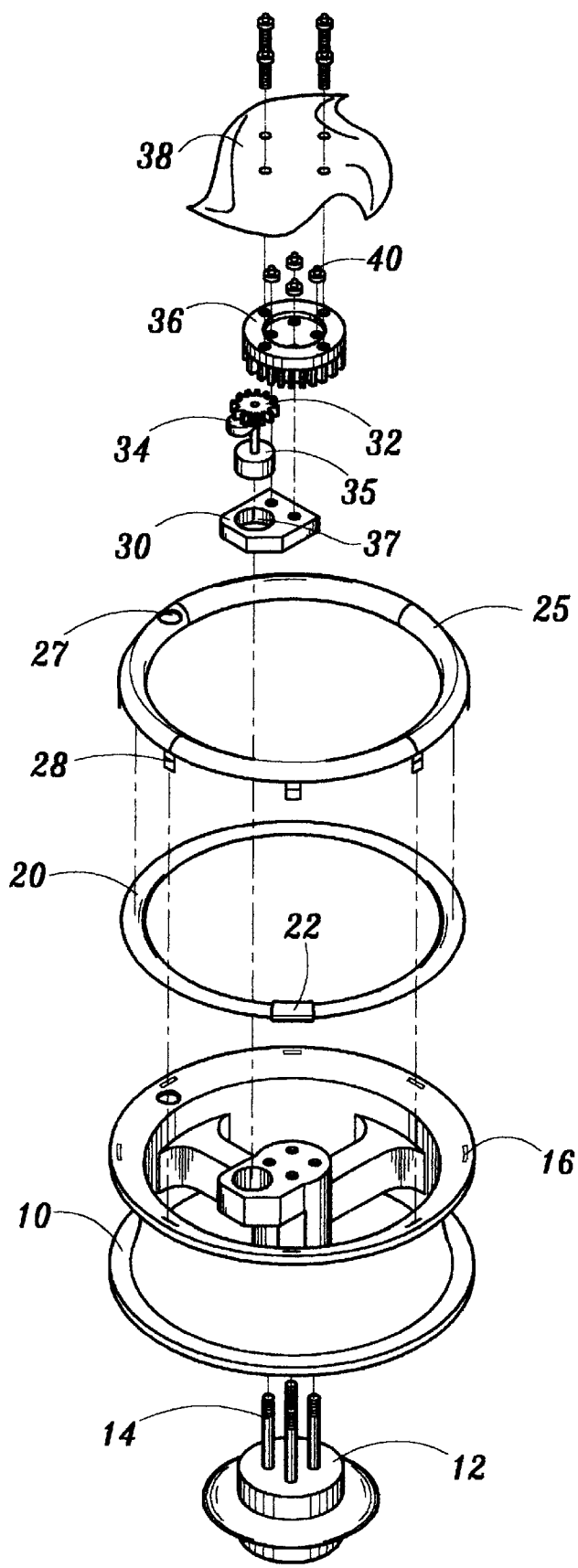
FIG. 2 is an exploded view showing the component part of the present invention.

Referring to FIG. 1, FIG. 2, the light emitting rotating body of the present invention comprises a wheel 10, a hub rotating disc 12 with screw bolts 14, a lighting unit 20, a protecting enclosure for the lighting unit 25, a fixing plate 30, a gear wheel 32, an eccentric swinging block 34, an extra miniature generator 35, a bearing disc 36, a vane 38 with a plurality of fixing bolts and nuts 40. Several laying slots 16 are provided around inner circumferencial edge of the wheel 10, and an electronic rectifier circuit 22 is provided appropriately associated with the lighting unit 20. A ventilation hole 27 and a plurality of inserts 28 are provided for the protecting enclosure 25 for fixing the protecting enclosure 25. Meanwhile, the gear wheel 32 and the eccentric swing block 34 are engaged to the generator's (35) shaft, and the bearing disc 36 is divided into an inner ring and an outer turnable ring, and the outer turnable ring thereof is provided with gear teeth.

Wheel 10 is fitted to the hub rotating disc 12 with its center fixing part. Then sequentially disposing light emitting unit 20 in the protecting enclosure 25; inlaying the plurality of inserts 28 into corresponding laying slots 16 prepared around the wheel 10; fitting the ventilation hole 27 to the air value seat of the tire so as to complete installation of the light emitting unit 20 together with it protecting enclosure 25 on the wheel. An opening 37 for setting the generator 35 is provided for the fixing plate 30 which is mounted on the fixing part at the center of the wheel 10. Electrical contactors for power output are formed on the fixing plate 30. The gear wheel 32 and the eccentric swinging block 34 are coaxially mounted on the generator's (35) shaft. The gear wheel 32 is engaged to the gear teeth formed around the outer turnable ring of the bearing disc 36. On the other hand, the inner ring of the bearing disc 36 is conjoined with the screw bolts 14 of the hub rotating disc 12 and the fixing plate 30, while the outer turnable ring of the bearing disc 36 is further conjoined to the independent rotatably structured vane 38. As soon as the above-mentioned component parts have been conjoined with each other, the nuts 40 and screw bolts 14 are tightened together thereby completing assembly of the present invention.

Taking to the wheel tire for example, the vane 38 begins to rotate following the rotation of the tire when the automobile starts moving, the gear wheel 32 is driven to rotate in the reverse direction against the rotating direction of the generator's shaft which being driven by the driving torque of the outer ring of the bearing disc 36 imparted by the conjoined vane 38. At the same time, the rotor of the generator 35 is also driven to rotate and the generator 35 delivers current to turn on the light emitting unit 20.

The aim for using the eccentric swinging block 34 is for increasing rotational inertia. This aim is achieved by attaching an irregular circular block to the shaft of the extra miniature generator 35 to form an eccentric swing block 34 which produces a centrifugal force when the generator 35 is in operation. In additional the eccentric swinging block 34 further produces a reciprocating force perpendicular to the ground due to vibration caused by the rolling of the tire on the ground when the automobile is advancing. This force causes the eccentric swinging block 34 to produce vertical kinetic energy, and then exacerbating increase of kinetic energy of circuit motion thereof thereby increasing rotative speed of the generator 35.

The light sources usable for constructing the light emitting unit 20 are neon lamp, cold cathode fluorescent lamp, LED and EL. In the case EL is employed, it can be directly coated on a visible position at wheel tire side. Suitable designed electrical input terminals connected to a rectifier circuit should be provided for specific light sources used for the light emitting unit 20.

The light emitting unit 20 can be configured into various geometrical figures such as U, tubular, and triangular shapes. The light emitting unit 20 can be a single one, or plural numbers, or even composed of plural numbers of different kind according to the pattern to be formed between supporting members of the wheel 10.

Some kind of electric energy stored circuit or a battery unit can be provided for the electronic circuit for supplying power to the load. The rectifier circuit may be pad mounted, or separately accommodated in an enclosure.

Figure 3:
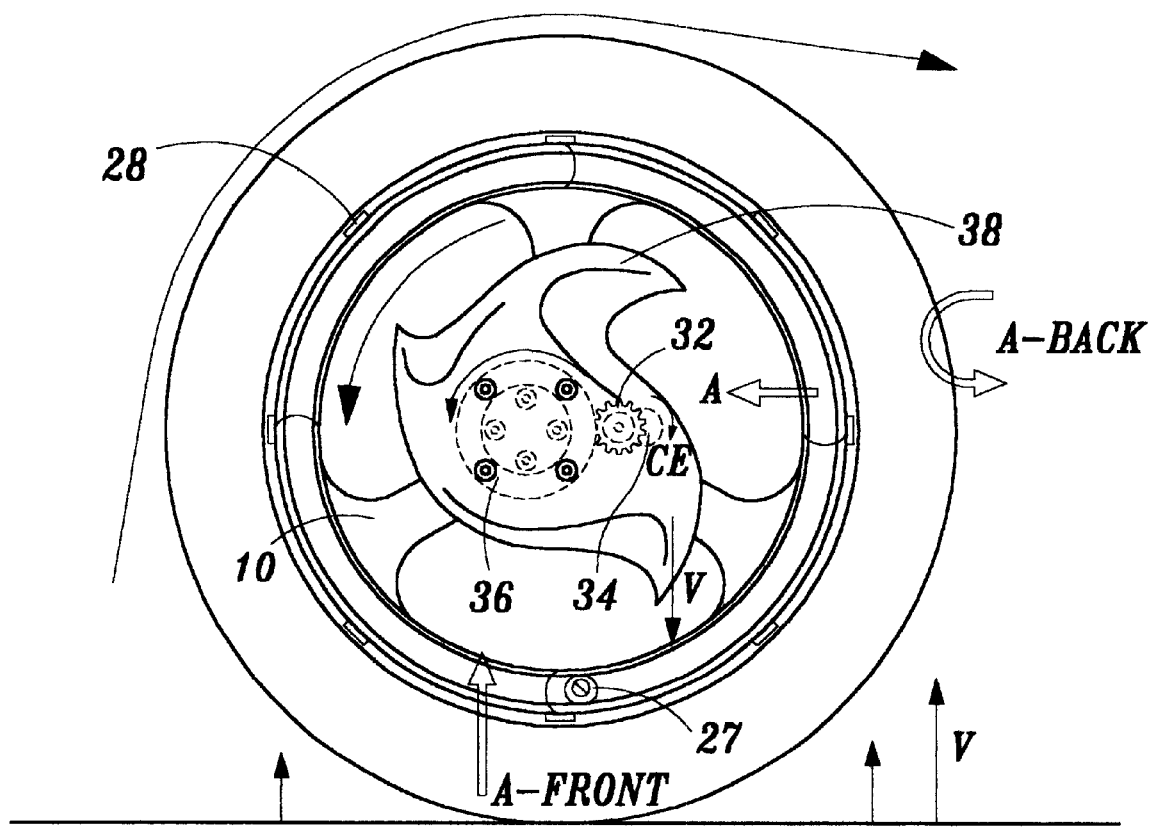
FIG. 3 is a front schematic view for illustrating directions of acting forces exerting on the light emitting rotating body of the present invention.
Figure 4:
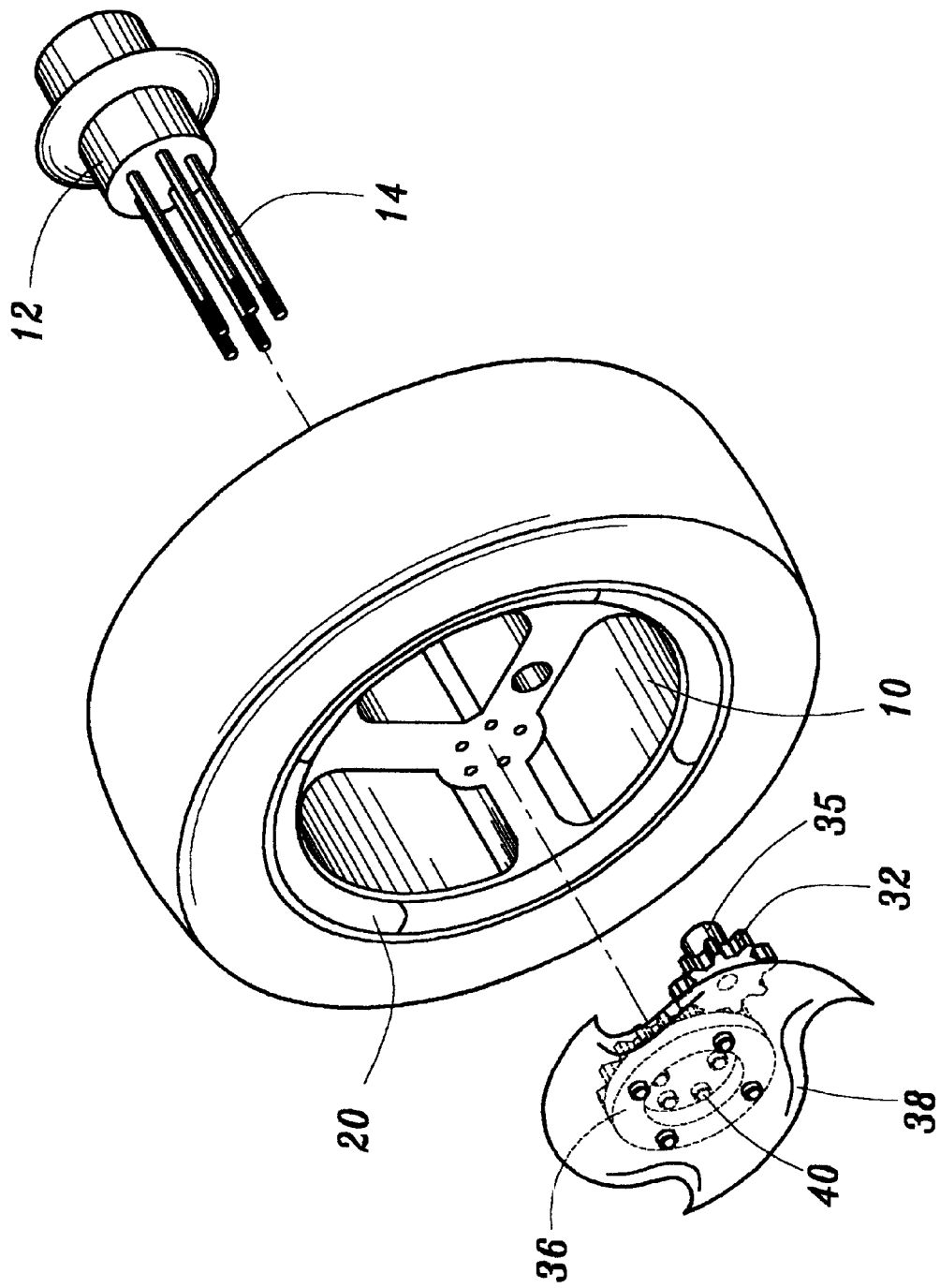
FIG. 4 is an exploded structure view in another embodiment of the present invention.

Referring to FIG. 3, showing directions of acting forces exerting on the light emitting rotating body, the required power for turning on the light emitting unit 20 is directly supplied by the extra miniature generator 35 which is driven by the specially constructed three dimensional vane 38. However, the other sources of kinetic energy are provided by sum of a counter acting air force against wind pressure, airflow forces passing both sides, A-front and A-back of the rotating body, a centrifugal force CE generated by the rotating body, and a vertical vibration force of the rotating body. Although a conventionally shaped vane may be used, yet the specially designed three dimensional vane 38 associated with the eccentric swinging block 34 is employed in the present invention to enhance the effect of continuous smooth power generation of the generator 35. As soon as the rotating body ceases rotation, the generator 35 also gradually stops operation. In another embodiment, the vane 38, generator 35, and light emitting unit 20 can be assembled in one piece as shown in FIG. 4. With this structure, the wheel 10 is used as a base on which the generator 35, the electronic circuit 22, the light emitting unit 20, the protecting enclosure 25, the bearing disc 36, and the vane 38 are mounted such that two essential composition parts, e.g. the generating mechanism and the light emitting mechanism are assembled in a whole unit. With this structure, the bearing disc 36 which belongs to the generating mechanism is engaged to the wheel 10 with its inner ring, while screw combined to the vane 38 with its outer ring.

Figure 5:
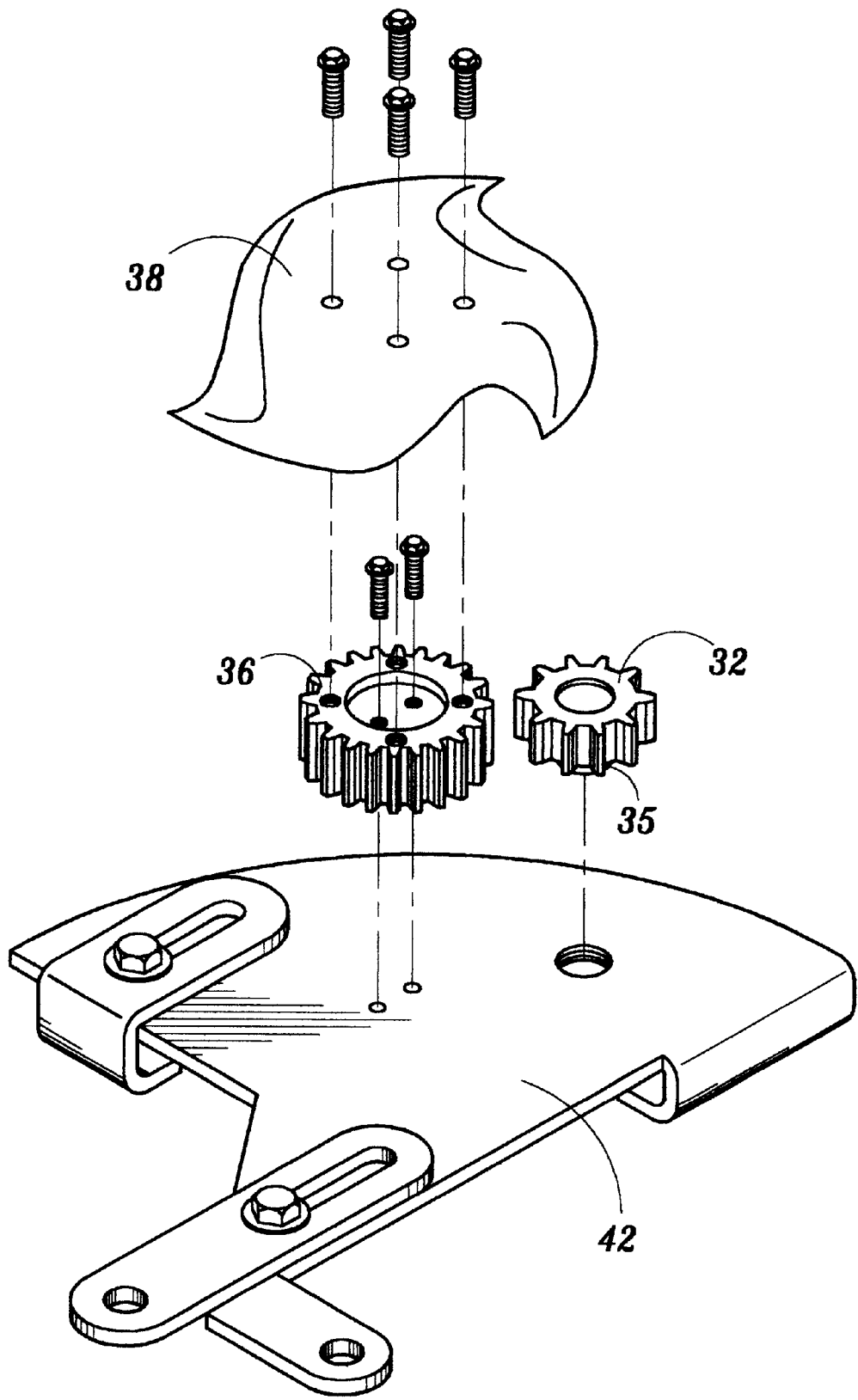
FIG. 5 is an illustrative view showing how the light emitting unit of the present invention is installed on a spoke car wheel.

As shown in FIG. 5, if the wheel 10 is a spoke car wheel, the vane 38, the bearing disc 36 and the generator 35 can be mounted on a common fixing plate 42.

In summary, the present invention has several features which are distinctly superior to any other conventional techniques, and are as follows:

1. The light emitting unit provided on the rotating wheel of an automobile helps illuminating the two sides of the automobile where usually is a dangerous zone thereby greatly contributing to traffic security.
2. The illuminated rotating body on an automobile beautifies the night scenery of the roadway and street.
3. The innovative utilization of abandoned kinetic energy of a moving automobile stimulates people's intention for further study on energy saving problem.
4. The elaborate design of the extra miniature generator in the present invention is a pioneer for development of high efficiency and versatile extra miniature DC/AC generators.

While it will be apparent that the preferred embodiments of the present invention disclosed are well calculated to provide the advantages and features above stated, it will be appreciated that the invention is susceptible to modification, variation and change without departing from the proper scope or fair meaning of the subjoined claims.

What is claimed is:

1. A light emitting rotating body on an automobile comprising:

a rotating body composed of a wheel, a wheel cap, a hub rotating disc with screw bolts, and a tire inlaid around said wheel;

a generating mechanism including an extra miniature generator mounted on said rotating body, a three dimensional vane for driving said generator rotor, an eccentric swinging block and a bearing disc with associated transmission gear wheel for continuously driving said generator by enhancing rotation of said rotating body so as to generate continuously effective electrical power;

a light emitting unit operatable with AC/DC power supply, accommodated in a protecting enclosure, and connected to an electronic rectifier circuit; and a fixing base to be mounted on said rotating body, or to be fixed to the screw unit of air valve seat of said tire;

with this structure, said extra miniature generator is driven by rotation of said rotating body and produces electrical power to supply said light emitting unit.

2. The light emitting unit as claimed in claim 1, wherein said bearing disc has an inner ring and an outer turnable ring.

3. The light emitting unit as claimed in claim 2, wherein the outer turnable ring of said bearing disc is provided with a plurality of gear teeth.

4. The light emitting unit as claimed in claim 1, wherein said eccentric swing block and the transmission gear wheel of said bearing disc are engaged to the generator shaft.

5. The light emitting unit as claimed in claim 1, wherein an electric energy stored circuit or a battery unit can be provided for said rectifier circuit of said generator for supplying power to the load of said light emitting unit.

6. The light emitting unit as claimed in claim 1, wherein light source of said light emitting unit are neon lamp, cold cathode fluorescent lamp, LED, and EL.

7. The light emitting unit as claimed in claim 1, wherein said generating mechanism and said light emitting unit can be assembled in a whole unit.

8. The light emitting unit as claimed in claim 7, wherein the inner ring of said bearing disc is engaged to said wheel.

9. The light emitting unit as claimed in claim 7, wherein said vane, said bearing disc, and said generator can be mounted on a common fixing plate to be formed in a whole unit.

\* \* \* \* \*